(12) United States Patent
Chan et al.

(10) Patent No.: US 10,367,594 B2
(45) Date of Patent: Jul. 30, 2019

(54) METHOD AND APPARATUS FOR FINE TIMING OFFSET ESTIMATION

(71) Applicant: Hong Kong Applied Science and Technology Research Institute Co., Ltd., Shatin, N. T. (HK)

(72) Inventors: Ho Yin Chan, Kowloon (HK); Chang Li, Gaithersburg, MD (US); Man Wai Kwan, Shatin New Territories (HK); Yuxian Zhang, Fanling (HK); Kong Chau Tsang, Kowloon (HK)

(73) Assignee: Hong Kong Applied Science and Technology Research Institute Co., Ltd., Shatin NT (HK)

( * ) Notice: Subject to any disclaimer, the term of this patent is extended or adjusted under 35 U.S.C. 154(b) by 206 days.

(21) Appl. No.: 15/616,002

(22) Filed: Jun. 7, 2017

(65) Prior Publication Data

US 2018/0359043 A1 Dec. 13, 2018

(51) Int. Cl.
*H04J 11/00* (2006.01)
*H04L 25/02* (2006.01)

(52) U.S. Cl.
CPC ...... *H04J 11/0036* (2013.01); *H04L 25/0204* (2013.01); *H04L 25/0212* (2013.01)

(58) Field of Classification Search
None
See application file for complete search history.

(56) References Cited

U.S. PATENT DOCUMENTS

| | | | |
|---|---|---|---|
| 7,570,707 B2 | 8/2009 | Jensen | |
| 8,199,702 B2 | 6/2012 | Kuechler | |
| 8,576,782 B2 | 11/2013 | Kuechler | |
| 2004/0170197 A1 | 9/2004 | Mehta | |
| 2006/0133525 A1 | 6/2006 | Awad | |
| 2007/0019538 A1 | 1/2007 | Long | |
| 2010/0165915 A1 | 7/2010 | Kuechler | |
| 2011/0007789 A1* | 1/2011 | Garmany | H04L 25/022 375/224 |
| 2013/0022090 A1* | 1/2013 | Weng | H04L 25/03343 375/219 |
| 2013/0003807 A1 | 3/2013 | Ma | |
| 2017/0272119 A1* | 9/2017 | McLaughlin | H04B 1/7073 |
| 2018/0115439 A1* | 4/2018 | Bhatti | H04B 17/364 |

FOREIGN PATENT DOCUMENTS

| | | |
|---|---|---|
| CN | 105075206 A | 11/2015 |
| WO | 2016023600 A1 | 2/2016 |

OTHER PUBLICATIONS

International Search Report and Written Opinion; PCT/CN2017/090338: dated Feb. 26, 2018.

* cited by examiner

*Primary Examiner* — Robert M Morlan

(57) ABSTRACT

Provided is a method of determining timing of arrival of a signal on a path to a receiver in a mobile wireless communications system. The method comprises obtaining a channel impulse response (CIR) of a signal received at the receiver and deriving a power characteristic of the CIR. The method includes producing a first derivative of the power characteristic with respect to time, selecting some or all extrema from the first derivative of the power characteristic as indicative of candidate signal paths, and selecting one or more of said candidate signal paths. The method preferably includes determining timing of arrival of a signal on a first path of arrival at the receiver by assessing an energy value of each of said candidate signal paths against a threshold value.

19 Claims, 10 Drawing Sheets

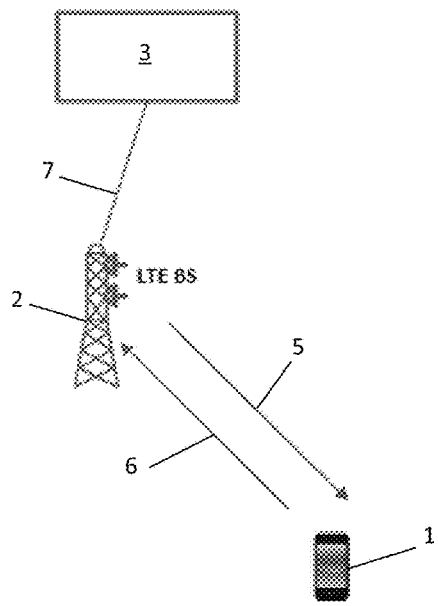
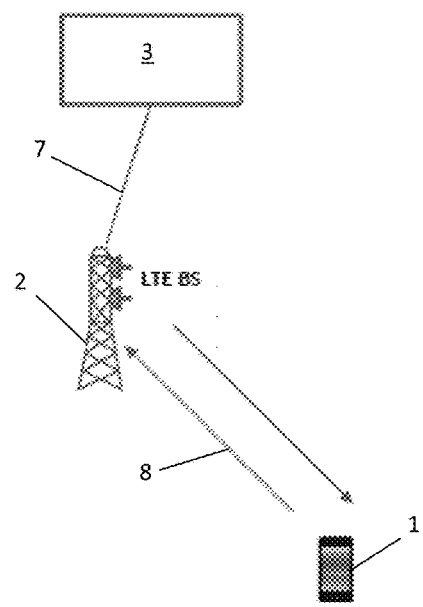
Figure 1A                    Figure 1B
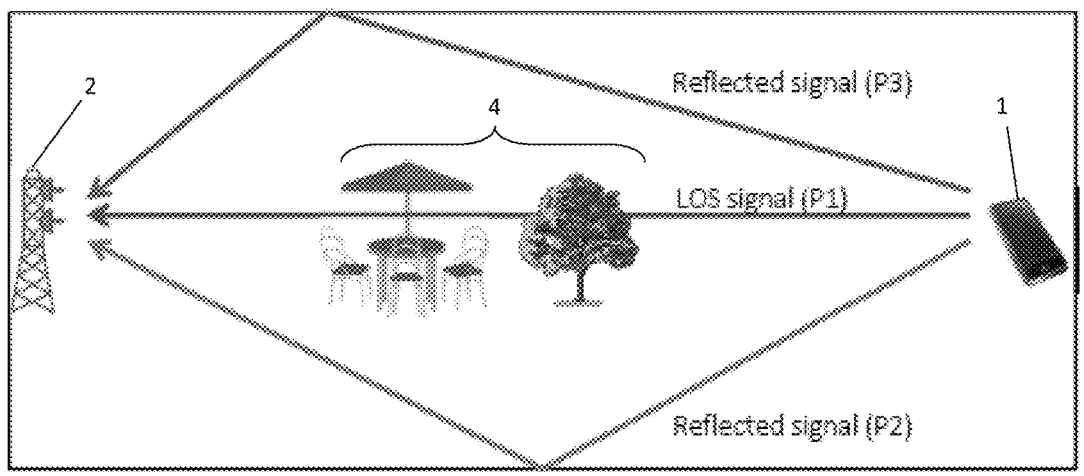
Figure 2

METHOD AND APPARATUS FOR FINE TIMING OFFSET ESTIMATION

FIELD OF THE INVENTION

The invention relates generally to a method and apparatus for determining timing of arrival of a signal on a path to a receiver in a mobile wireless (cellular) communications system and more particularly, but not exclusively to a method and apparatus for timing offset estimation in an Orthogonal Frequency Division Multiplexing (OFDM) mobile wireless communications system.

BACKGROUND OF THE INVENTION

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., frequency/time resources). Examples of such multiple-access technologies include time division multiple access (TDMA) systems, frequency division multiple access (FDMA) systems, code division multiple access (CDMA) systems, time division synchronous code division multiple access (TD-SCDMA) systems, orthogonal frequency division multiple access (OFDMA) systems, and single-carrier frequency division multiple access (SC-FDMA) systems.

These multiple access technologies have been adopted in various telecommunications standards to provide a common protocol that enables different wireless devices to communicate on a municipal, national, regional, and even global level. An example of a telecommunications standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards preferably using OFDMA on the downlink (DL) and SC-FDMA on the uplink (UL).

There is an increasing need for accurate and reliable location positioning of User Equipments (UEs) within mobile wireless (cellular) communications networks. Some of said methods use entities within the networks to determine a UEs' position. The 3GPP standard identifies a number of standard position determining (positioning) methods including network-assisted Global Navigation Satellites Systems (GNSS) methods; downlink positioning methods; cell ID based methods, and enhanced cell ID based methods. 3GPP also supports hybrid positioning methods utilizing multiple methods from those mentioned above. Of the supported positioning methods, there are two major positioning paradigms in LTE systems, namely client-assisted/network-based positioning methods, and network-based positioning methods. The cell ID based methods and enhanced cell ID based methods are exemplary types of network-based positioning methods.

A typical client-assisted/network-based positioning paradigm is illustrated in FIG. 1A in which a UE 1 receiving a signal 5 measures received signal strength and received signal time difference and communicates 6 these measurements to the base station (BS) or eNB 2 which in turn communicates 7 them to an E-Serving Mobile Location Centre (E-SMLC) 3 which utilizes the measurements to estimate the position (location) of a UE 1 within the mobile network; more particularly a location within the cell of the serving BS/eNB 2. The E-SMLC 3 may be provided in the BS/eNB 2. By way of contrast, a typical network-based positioning paradigm is illustrated in FIG. 1B in which the UE 1 communicates as normal with the BS/eNB 2 and need not specifically report any measurements, and in which the BS/eNB 2 itself measures from a received signal 8 received signal strength and received signal time difference, communicates 7 the measurements to an E-SMLC 3 which utilizes the measurements to estimate the position (location) of a UE 1 within the mobile network. In this latter case, the BS/eNB 2 may also measure the signal angle of arrival for use in the position estimation process.

The client-assisted/network-based positioning paradigm (FIG. 1A) requires user involvement. For example, the user of a mobile device (UE) may need to install an application on the UE 1 or to setup a specific configuration on the UE 1. The network-based positioning paradigm (FIG. 1B) does not require any application to be installed on the UE 1 nor does it require the setup of any specific configuration on the UE 1. The network-based positioning paradigm can detect the location of the UE 1 as long as the UE 1 is powered on. This is useful if the user of the UE 1 loses the UE 1 and would like the mobile network service provider to locate and/or lock the UE 1 remotely.

The accuracy of detecting the location of the UE 1 using the network-based positioning paradigm depends on the accuracy of first signal path of arrival detection, more specifically time of arrival at the BS/eNB 2 of a signal on the first path of arrival, this path comprising the path of minimum propagation distance between the signal transmitting device, e.g. UE 1, and the signal receiver, e.g. BS/eNB 2. However, a multipath effect as illustrated in FIG. 2 may make a first signal path of arrival indistinguishable from other signal paths such as reflected signal paths. This is especially so in an indoor environment. As shown in FIG. 2, a line of sight (LOS) signal path P1 from a UE 1 to a BS/eNB 2 may be interrupted by obstacles 4 such that reflected signals P2, P3 arrive at the BS/eNB 2 by longer propagation paths, but with higher powers. The LOS path P1 and reflected paths P2, P3 comprise a set of multipaths. Consequently, the peak power of the channel impulse response (CIR) of a received signal BS/eNB 2 may not correspond with the first signal path of arrival (LOS path P1) due to the multipath effect. Attempts have been made to address the aforesaid issues.

U.S. Pat. Nos. 8,199,702 and 8,576,782 each discloses baseband recovery in wireless networks, base transceiver stations, and wireless networking devices to minimize the number of timing symbols while at the same time enabling wireless devices to use a relatively low per-symbol sampling rate, so that minimal processing is required to implement the timing recovery. A relatively low number of samples is taken per expected symbol interval during the training sequence. A subset of the samples is selected and processed to determine error signals for each of the samples. The error signals are multiplied by the expected symbol and summed to form an error signal. The error signal is used to adjust the set of samples that will be used and processed in connection with subsequent symbols. The error signal is also used to interpolate between available samples to infinitesimally approach the point of maximum eye opening.

US2004/0170197 discloses a method of synchronizing an Orthogonal Frequency Division Multiplexed (OFDM) IEEE 802.11a data packet at a receiver. The 802.11a data packet has a series of short training sequence (STS) symbols as a preamble. Cross-correlation at the receiver of the STS in the 802.11a packet PLCP preamble with the modified reference STS, that is circular shifted by eight samples, results in a main correlation peak but with reduced pre- and post-lobes. To locate the cross-correlation peak, a running second derivative of the cross-correlation function is performed. Peak selection employs a running comparison of the position and magnitude of all peaks in the intermediate neighbourhood of the local peaks; Following selection of a peak from within the cross-correlation function of the first STS in the PLCP preamble, both the position and magnitude of the first STS is compared to those of the second STS. Based on the two independent calculations, the start of the OFDM frame is estimated.

US2007/0019538 discloses that, for symbol synchronization in a communications system, a plurality of symbols corresponding to a transmitted signal is received, where the plurality of symbols include guard intervals. Peak correlation is obtained using the plurality of received symbols. The second derivative of the peak correlation is obtained, and one or more peaks within a corresponding guard interval are identified from the second derivative. A symbol start time for each received symbol is estimated based on the second derivative of the peak correlation.

U.S. Pat. No. 7,570,707 discloses a method for introducing a delay in either an envelope or a phase signal path of an RF polar transmitter in order to eliminate the delay mismatch between the two paths. For two signal paths, a faster signal may be delayed by a digital processor or a slower signal may be transmitted early so that signals in the two signal paths arrive at a specified circuit node in synchronization. Timing shift may be implemented in either the envelope signal path or the phase signal path and may be used to reduce or increase the timing of a signal path.

US2010/0165915 discloses a wireless network in which one of a base transceiver station and a wireless networking device are configured to implement baseband recovery. The recovery is performed by sampling a received training sequence at a relatively low number of times during each estimated training symbol interval to obtain a relatively low number of samples for each estimated training symbol interval. Then, selecting a contiguous subset of the relatively low number of samples and obtaining a first derivative associated with the subset. The first derivative is multiplied by an expected data symbol to obtain an error signal for the training symbol interval. Accumulating error signals from successive training symbol intervals form an accumulated error signal. A first portion of the accumulated error signal is used to adjust which of the relatively low number of samples are to be included in the contiguous subset in connection with processing a subsequent training symbols. Then, a second portion of the error signal is used to determine a likely position of a location of maximum eye opening to estimate the timing phase from the training sequence.

US2006/0133525 discloses a symbol timing estimation method for use in a communications system in which symbols are successively transmitted in a signal, each symbol comprising a predetermined number of symbol samples, and in which a series of L symbol samples is repeated N symbol samples after its original appearance, where L and N are integers. The method comprises: receiving said signal and processing the symbol samples in the received signal using N and L to obtain a correlation function for the originally-appearing series and the repeated series. It includes producing a basic measure for symbol timing estimation based on the obtained correlation function and producing a second-derivative measure for symbol timing estimation based on a second derivative of the basic measure. Symbol timing is estimated based on the basic and second-derivative measures. The first peak of the second-derivative measure is considered as the rising edge of the first peak of arrival, but, in many cases, this is not the first path of arrival at the receiver.

There is therefore a need to provide an improved means of identifying the first signal path of arrival in a multipath environment in a mobile wireless communications network, i.e. to identify which signal path constitutes the first signal path of arrival at the receiver or is likely to constitute the first signal path of arrival, or to determine a signal arrival time which constitutes the time of arrival at the receiver of a signal at the first signal path or the likely first signal path.

OBJECTS OF THE INVENTION

An object of the invention is to mitigate or obviate to some degree one or more problems associated with identifying timing of arrival of signals on signal paths to a receiver in a wireless communications network multipath environment.

The above object is met by the combination of features of the main claims; the sub-claims disclose further advantageous embodiments of the invention.

Another object of the invention is to provide a method and apparatus for identifying timing of arrival of a signal on a first path of arrival in a multipath environment.

Another object of the invention is to mitigate or obviate to some degree one or more problems associated with known wireless communications systems.

One skilled in the art will derive from the following description other objects of the invention. Therefore, the foregoing statements of object are not exhaustive and serve merely to illustrate some of the many objects of the present invention.

SUMMARY OF THE INVENTION

The invention provides a method of determining timing of arrival of a signal on a path to a receiver in a mobile wireless communications system. The method comprises obtaining a channel impulse response (CIR) of a signal received at the receiver and deriving a power characteristic of the CIR. The method includes producing a first derivative of the power characteristic with respect to time, selecting some or all extrema from the first derivative of the power characteristic as indicative of candidate signal paths, and selecting one or more of said candidate signal paths. The method preferably includes determining timing of arrival of a signal on a first path of arrival at the receiver by assessing an energy value of each of said candidate signal paths against a threshold value.

In a first aspect, the invention provides a method of determining timing of arrival of a signal on a path to a receiver in a mobile wireless communications system, the method comprising the steps of: obtaining a channel impulse response (CIR) of a signal received at the receiver; deriving a power characteristic of the CIR; producing a first derivative of the power characteristic with respect to time; selecting some extrema from the first derivative of the power characteristic as indicative of candidate signal paths; and selecting one or more of said candidate signal paths.

In a second aspect, the invention provides a non-transitory computer readable medium storing machine readable code which, when executed by a processor, causes a receiver provided in a mobile wireless communications network to perform the steps of the first aspect of the invention.

In a third aspect, the invention provides a receiver in a mobile wireless communications system for determining timing of arrival of a signal on a path to the receiver, the receiver comprising: a non-transitory computer readable medium storing machine readable code; and a processor configured to execute said machine code to cause the receiver to perform the steps of the first aspect of the invention.

The receiver may comprise a base station (BS) or eNode B in the mobile wireless communications system.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 1A illustrates a typical client-assisted/network-based user device positioning paradigm in a mobile wireless communications network;

FIG. 1B illustrates a typical network-based user device positioning paradigm in a mobile wireless communications network;

FIG. 2 illustrates a multipath signal path environment in a mobile wireless communications network;

DESCRIPTION OF PREFERRED EMBODIMENTS

Figure 3:
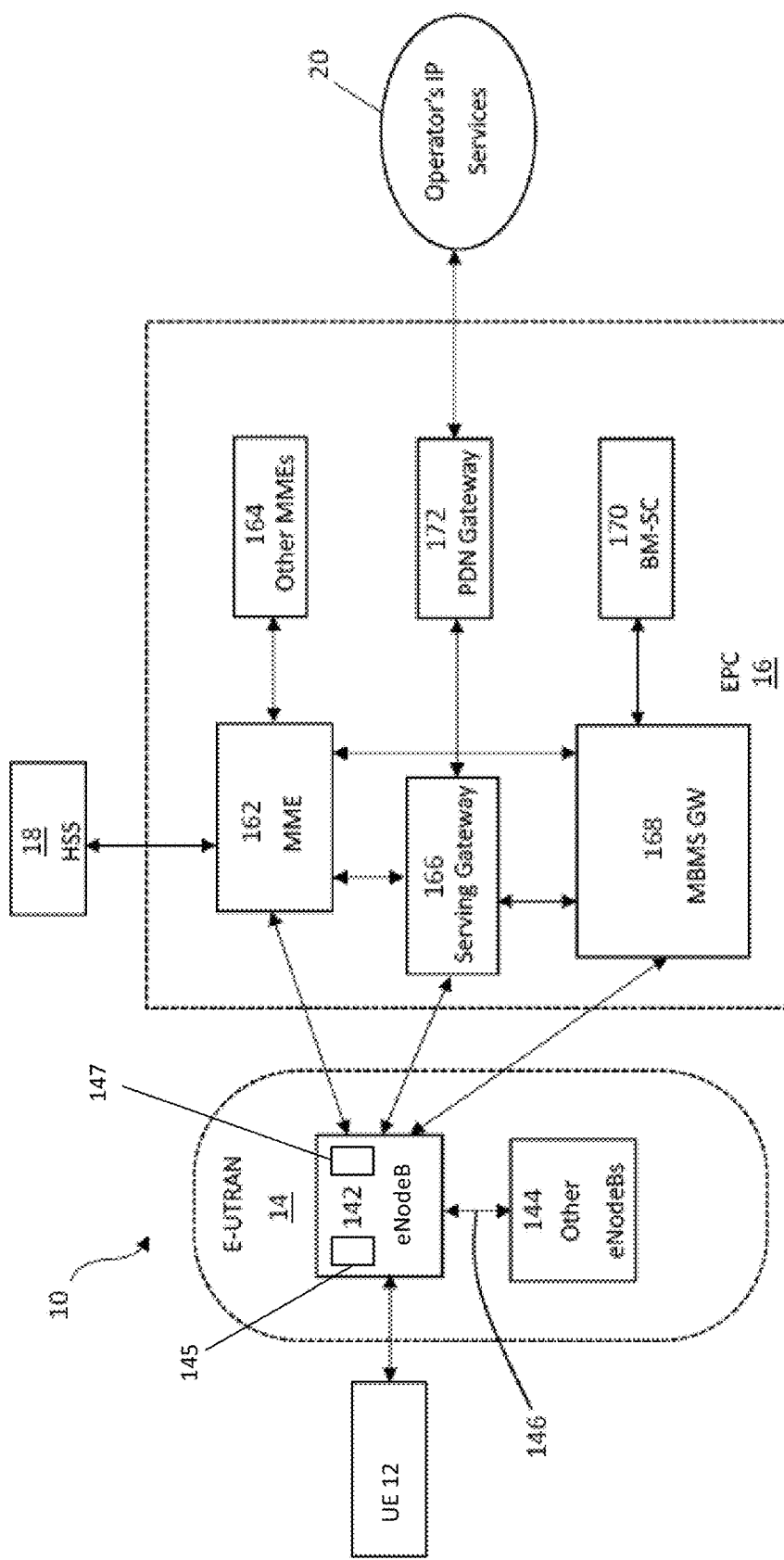
FIG. 3 is a diagram illustrating by way of example only a network architecture for embodiments of the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention relates generally to a method and apparatus for timing offset estimation in a mobile (cellular) wireless communications system and, more particularly, but not exclusively to a method and apparatus for fine timing offset estimation in an Orthogonal Frequency Division Multiplexing (OFDM) system.

FIG. 3 is a diagram illustrating, merely by way of example only, an LTE network architecture 10 in which the methods of the present invention can be performed, but it will be understood by one skilled in the art that the methods may be performed in other network architectures. The LTE network architecture 10 of FIG. 3 may be referred to as an Evolved Packet System (EPS) 10. The EPS 10 may include one or more user equipment (UE) 12, an Evolved UMTS Terrestrial Radio Access Network (E-UTRAN) 14, an Evolved Packet Core (EPC) 16, a Home Subscriber Server (HSS) 18, and an Operator's Internet Protocol (IP) Services 20. The EPS 16 can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 14 includes an eNB 142 and other eNBs 144. The eNB 142 provides user and control plane protocol terminations toward the UE 12. The eNB 142 may be connected to the other eNBs 144 via a backhaul (e.g., an X2 interface) 146. The eNB 142 may also be referred to herein as a BS, a Node B, an access point, a TRP, a base transceiver station, a radio base station, a radio transceiver, a transceiver function, a basic service set (BSS), an extended service set (ESS), or some other suitable terminology. The eNB 142 provides an access point to the EPC 16 for a UE 12. Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 142 is connected to the EPC 16. The EPC 16 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is the control node that processes the signaling between the UE 12 and the EPC 16. Generally, the MME 162 provides bearer and connection management. All user IP packets are transferred through the Serving Gateway 166, which itself is connected to the PDN Gateway 172. The PDN Gateway 172 provides UE IP address allocation as well as other functions. The PDN Gateway 172 is connected to the Operator's IP Services 20. The Operator's IP Services 20 may include the Internet, an intranet, an IP Multimedia Subsystem (IMS), and a PS Streaming Service (PSS). The BM-SC 170 may provide functions for MBMS user service provisioning and delivery. The BM-SC 170 may serve as an entry point for content provider MBMS transmission, may be used to authorize and initiate MBMS Bearer Services within a PLMN, and may be used to schedule and deliver MBMS transmissions. The MBMS Gateway 168 may be used to distribute MBMS traffic to the eNBs (e.g., 142, 144) belonging to a Multicast Broadcast Single Frequency Network (MBSFN) area broadcasting a particular service, and may be responsible for session management (start/stop) and for collecting eMBMS related charging information. The eNB 142 comprises a processor 145 and a memory 147 for storing machine machine readable instructions, e.g. software, which, when executed by the processor 145 configures the eNB 142 to perform the methods of the invention.

Figure 4:
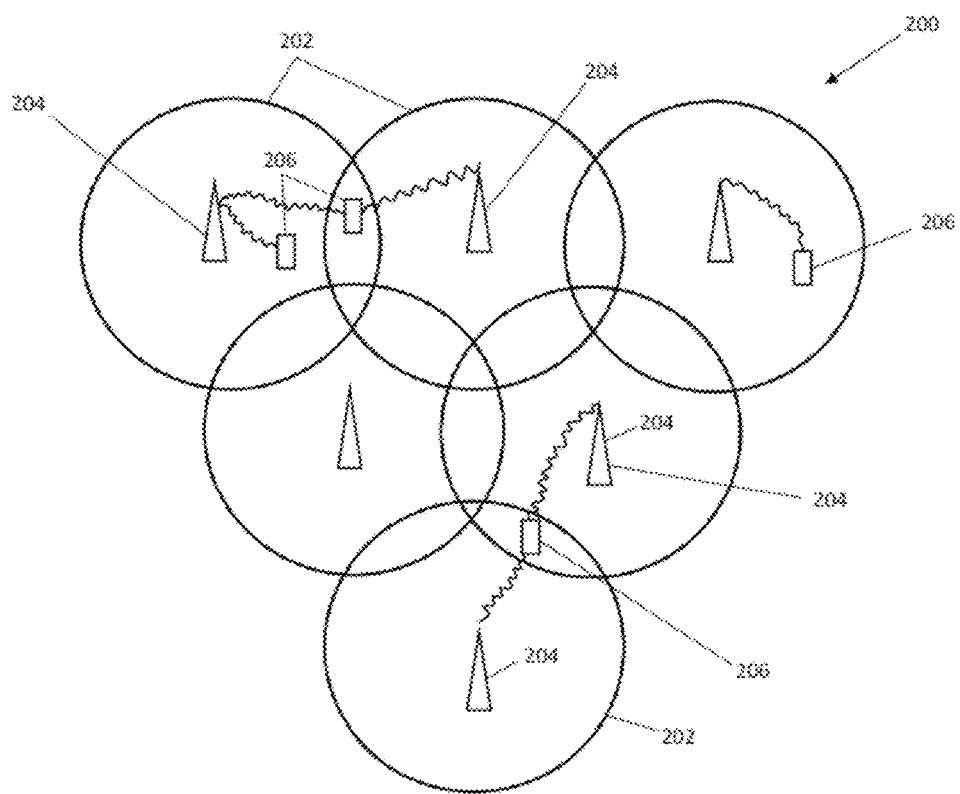
FIG. 4 is a diagram illustrating by way of example only an access network for embodiments of the present invention.

FIG. 4 is a diagram illustrating an example of an access network 200 in an LTE network architecture such as that described with respect to FIG. 1. In this example, the access network 200 is divided into a number of cellular regions (cells) 202. There is no centralized controller in this example of an access network 200, but a centralized controller may be used in some configurations. The eNBs 204 may be configured to provide all radio related functions including radio bearer control, admission control, mobility control, scheduling, security, and connectivity to the serving gateway 166. An eNB may support one or multiple cells (also referred to as a sector). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is preferably used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunications standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communications standard and the multiple access technology employed will depend on the specific application and the overall design constraints imposed on the system.

Figure 5:
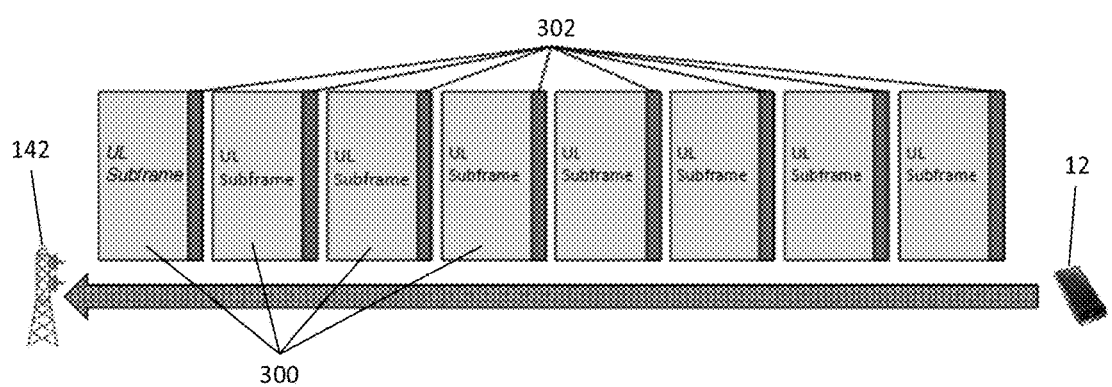
FIG. 5 is a diagram illustrating transmission of LTE sounding references signals (SRSs) in a LTE frame.

There are two types of reference signals for UL in LTE. The first are Demodulation Reference Signals (DM-RS) which are used to enable coherent signal demodulation at the eNB 142. These signals are time multiplexed with UL data and are transmitted on the fourth or third SC-FDMA symbol of UL slot for normal or extended cyclic prefix (CP), respectively, using the same bandwidth as the data. The second type of reference signal for UL in LTE is the Sounding Reference Signal (SRS) which is used to allow channel dependent (i.e. frequency selective) UL scheduling as the DM-RS cannot be used for this purpose since they are assigned over the assigned bandwidth to a UE 12. The SRS is transmitted separately from the Primary Uplink Control Channel (PUCCH) and the Primary Uplink Shared Channel (PUSCH). SRS can be transmitted on any number of subcarriers in the last symbol in a UL subframe 300 as illustrated in FIG. 5 whether or not the subcarriers are assigned to another channel. SRS 302 is transmitted by a UE 12 to give the receiver (eNB) 142 an idea of the channel characteristics for that UE 12. The eNB 142 can use the information to assign good UL allocations for the UE 12 to transmit on.

Figure 6:
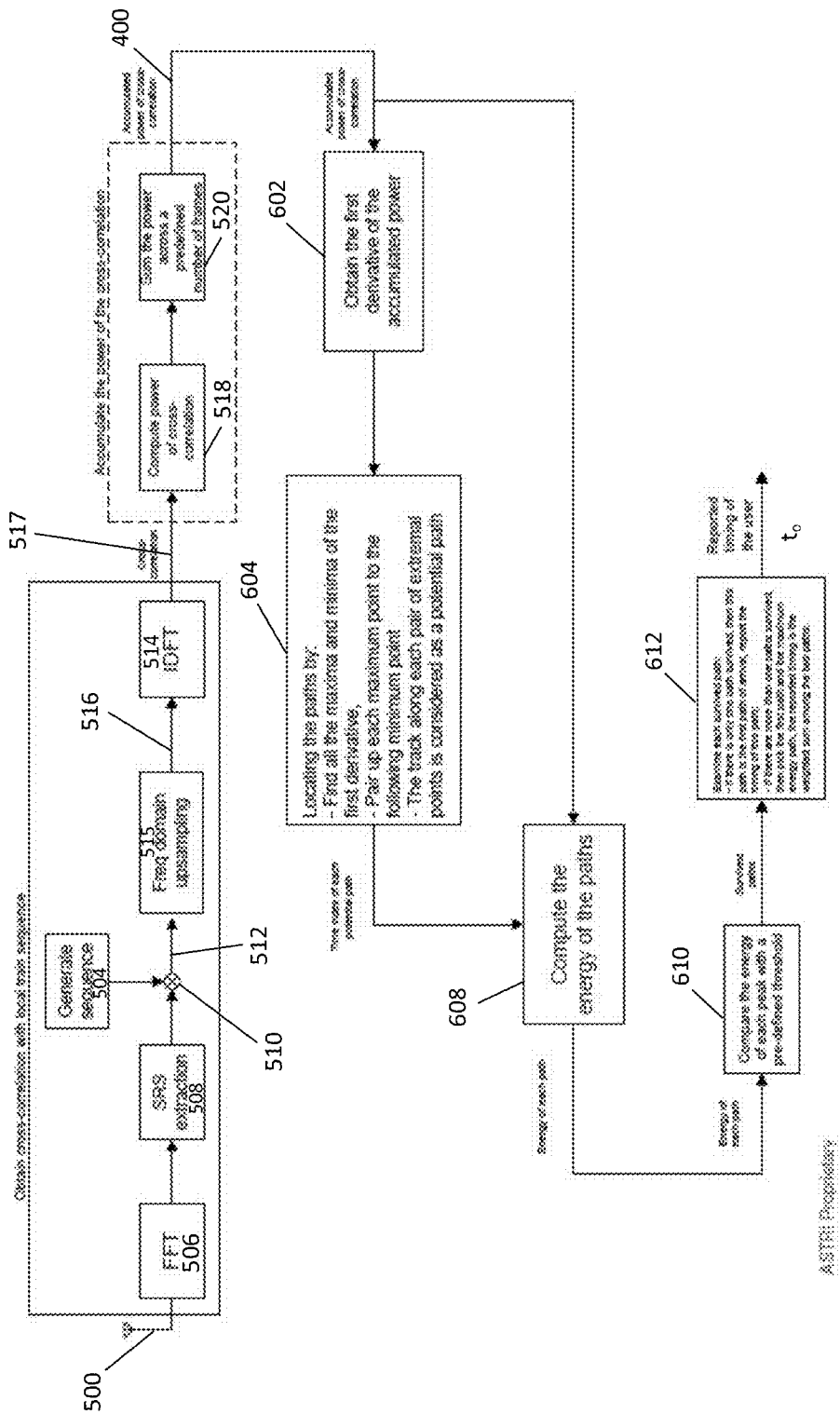
FIG. 6 is a schematic process flow diagram illustrating both the system elements/modules and process steps implemented in a receiver in accordance with the invention.
Figure 7A:
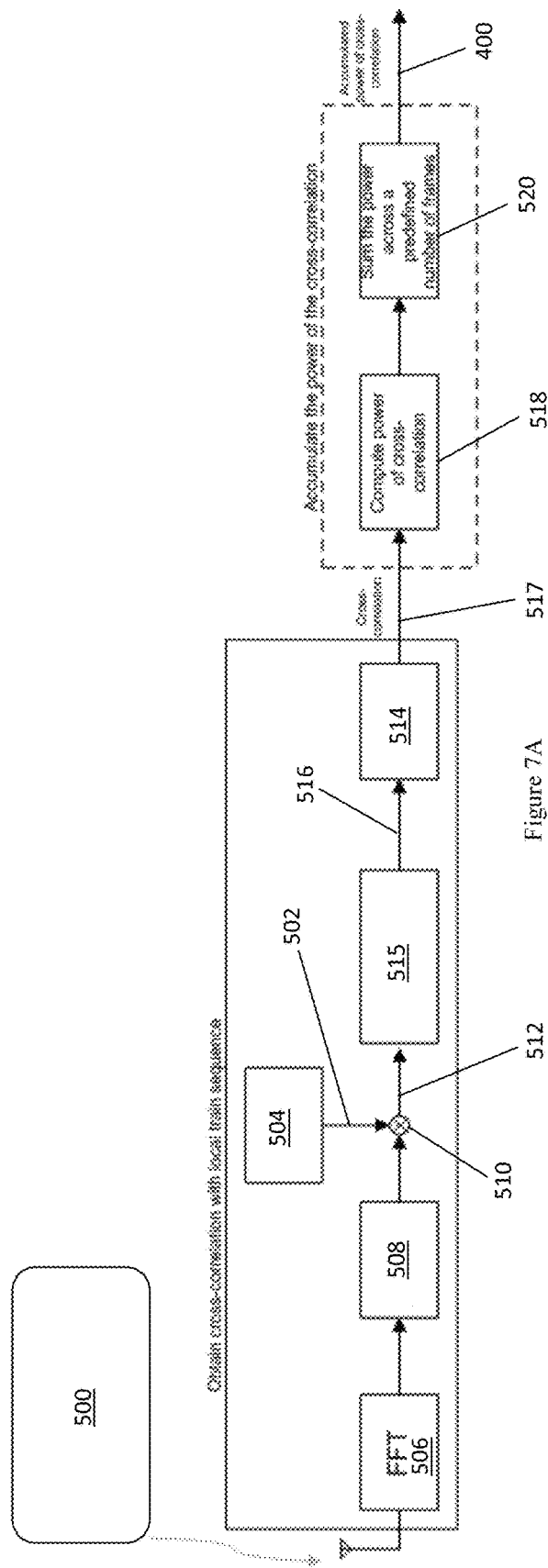
FIG. 7A is a part of the schematic process flow diagram of FIG. 6 illustrating elements/modules and process steps for obtaining a channel impulse response (CIR) of a signal received at the receiver and deriving a power characteristic of the CIR.
Figures 7B, 7C:
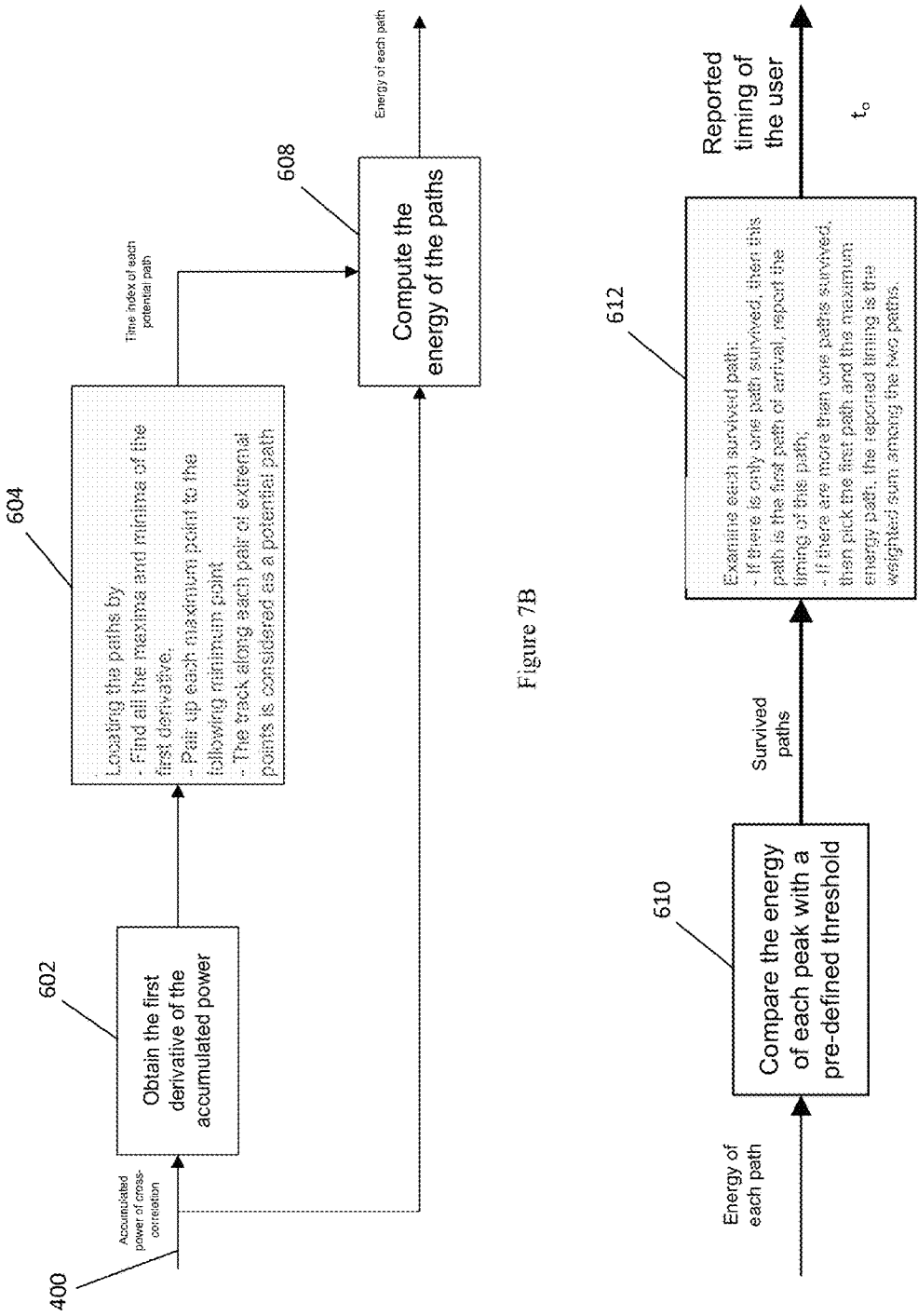
FIG. 7B is a part of the schematic process flow diagram of FIG. 6 illustrating elements/modules and process steps for producing a first derivative of the power characteristic with respect to time and selecting some extrema from the first derivative of the power characteristic as indicative of candidate signal paths.
FIG. 7C is a part of the schematic process flow diagram of FIG. 6 illustrating elements/modules for selecting one or more of said candidate signal paths.

FIG. 6 is a schematic process flow diagram illustrating both the system elements and process steps implemented in a receiver such as the eNB 142 in performing a method in accordance with the invention. FIGS. 7A to 7C further illustrate the system elements and process steps. It will be understood that the system elements and process steps may be implemented through any combination of software, middleware and hardware in the receiver, e.g the eNB 142.

Figure 8A:
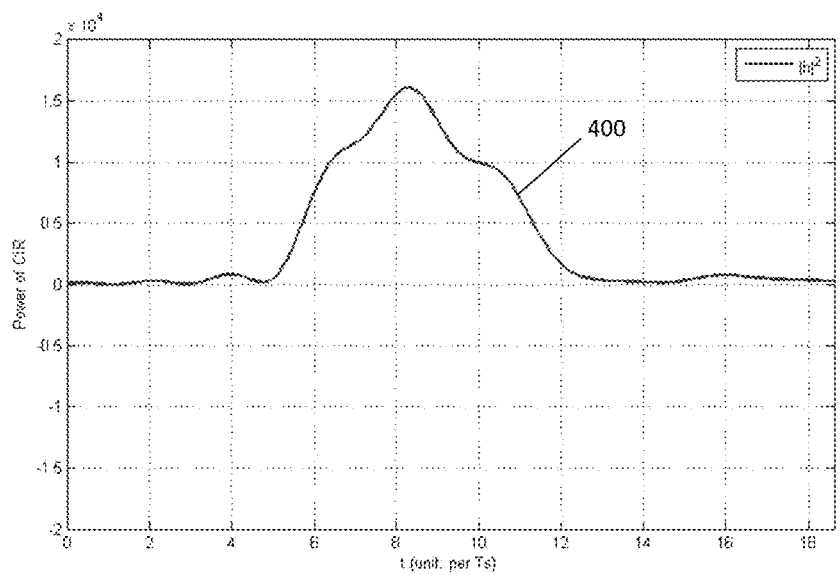
FIG. 8A illustrates a clean version of a power versus time characteristic derived from the CIR of a signal received at the eNB.
Figure 8B:
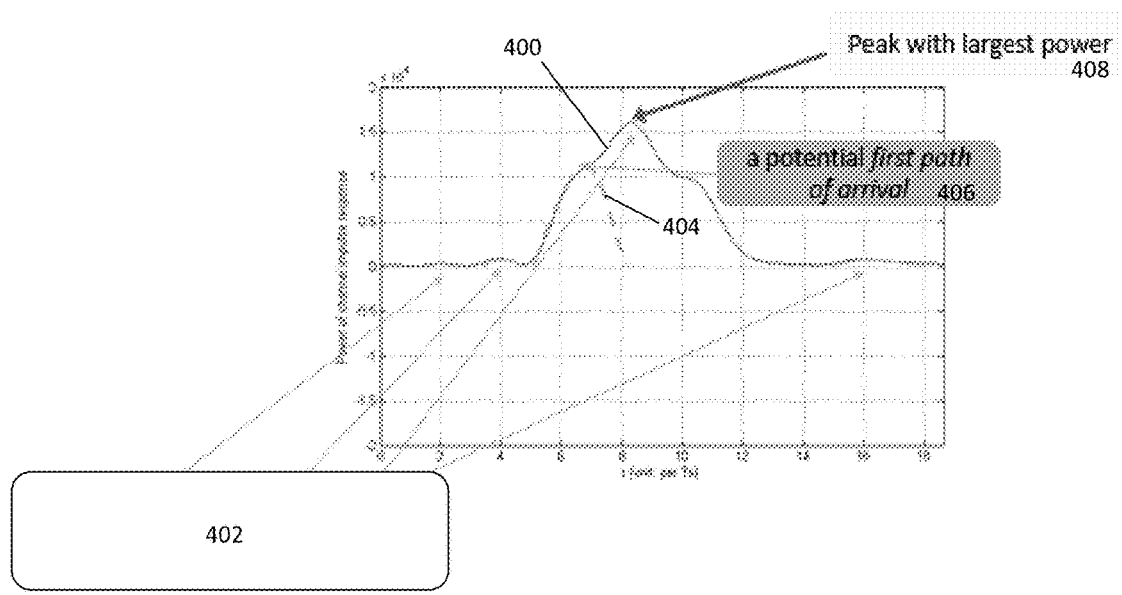
FIG. 8B illustrates the power versus time characteristic showing power peaks identified as possible candidate signal paths.

The invention is intended to identify all potential signal peaks and determine the time of the first arrival path at the receiver based on these peaks. FIGS. 8A and 8B illustrate a derived power characteristic of a channel impulse response (CIR) of a signal received at the eNB 142. FIGS. 9A-E illustrate the routines, schemes or methods which, when combined, comprise the method of the invention as defined herein.

Generally, the method of the invention determines timing of arrival of a signal on a path to an eNB 142 in the mobile wireless communications system 10 and preferably is directed to determining the time of arrival of the first path signal comprising the signal having the shortest propagation distance from the transmitting device, UE 12, to the receiving device, eNB 142. The method comprises the steps of obtaining a channel impulse response (CIR) of a signal received at the receiver and deriving a power characteristic of the CIR and these steps are illustrated in more detail by FIGS. 6 and 7A. The method includes producing a first derivative of the power characteristic with respect to time and selecting some extrema from the first derivative of the power characteristic as indicative of candidate signal paths and these steps are illustrated in more detail by FIGS. 6 and 7B. Finally, the method includes selecting one or more of said candidate signal paths and this step is illustrated in more detail by FIGS. 6 and 7C. These steps will be explained in greater detail below.

FIG. 8A illustrates a clean version of a power versus time characteristic 400 derived from the CIR of a signal received at the eNB 142 from the UE 12. The CIR of the signal received at the eNB 142 and the power versus time characteristic 400 derived therefrom can be obtained by any suitable known methods, but the preferred methods are described below. FIG. 8B shows the same derived power characteristic 400, but identifying turning points or peaks 402 in the power characteristic which may comprise possible candidate signal paths in a multipath environment between the UE 12 and the eNB 142. Dashed line 404 in FIG. 8B identifies what might constitute the first path of arrival 406 which it will be seen does not correspond in this instance with the peak 408 having the largest power.

Referring to FIGS. 6 and 7A, the CIR of the signal 500 received at the eNB 142 is preferably obtained by deriving a cross-correlation of the received signal 500 with a local training sequence 502. The received signal 500, i.e. the signal transmitted by the UE 12 to the eNB 142, preferably comprises an uplink (UL) LTE OFDM sounding reference signal (SRS) 500. The local training sequence 502 is preferably an OFDM SRS 502 generated by a sequence generating module 504 at the eNB 142 for deriving the cross-correlation or autocorrelation of the received SRS 500 with the locally generated SRS 502. The cross-correlation between the received SRS 500 and the locally generated SRS 502 can be obtained by firstly converting the received SRS 500 to frequency domain by Fast Fourier Transform (FFT) in a FFT module 506. The received SRS 500 can then be extracted by an extraction module 508 from a configured region in a signal resource grid in a manner familiar to a skilled artisan. Once the SRS 500 has been extracted, it is then multiplied in a multiplying module 510 with the locally generated SRS 502. Following this, the product 512 of the multiplying module 510 is preferably up-sampled in a frequency domain up-sampling module 515 to a size larger than the FFT size. Finally, the up-sampled product 516 is converted to time domain by an Inverse Discrete Fourier Transform (IDFT) module 514 to obtain the cross-correlation between the received SRS 500 and the locally generated SRS 502 to provide the CIR 517.

Referring again to FIGS. 6 and 7A, the power characteristic 400 of the CIR 517 is preferably derived by firstly using a power accumulating module 518 to accumulate power of the cross-correlation between the received SRS 500 and the locally generated SRS 502 across a number of subframes of the received SRS 500 and then, in a power summing module summing 520, summing the accumulated power across a number of frames of the received SRS 500 to provide a accumulated power of cross-correlation, i.e. the power characteristic 400. The number of subframes and the number of frames of the received SRS 500 may be selected or calculated, i.e. predefined.

Figure 9A:
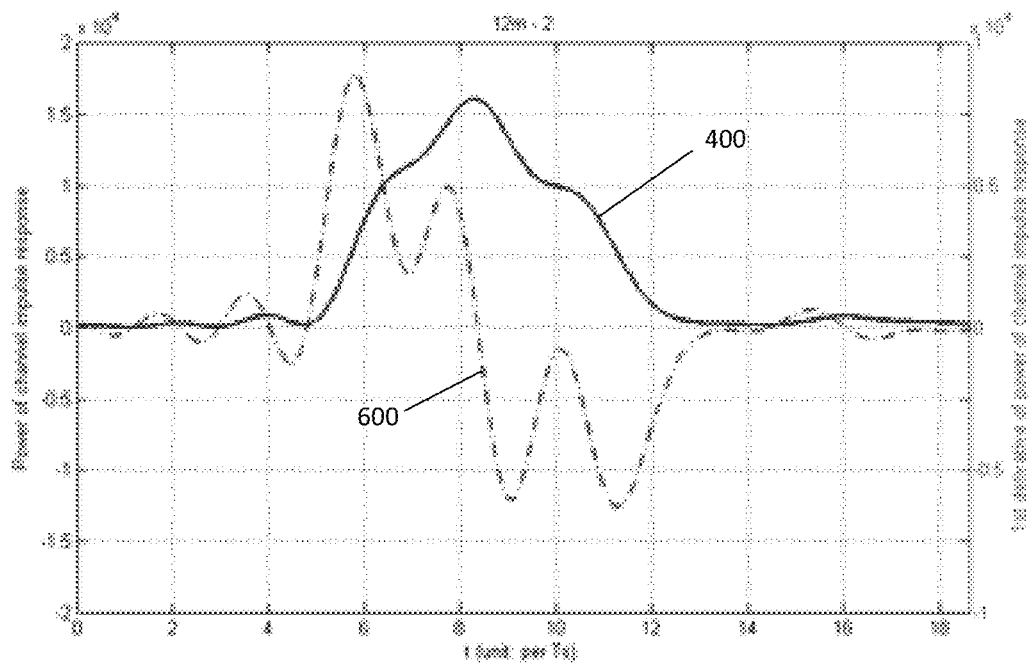
FIG. 9A illustrates the power versus time characteristic showing a first derivative signal produced therefrom.
Figure 9B:
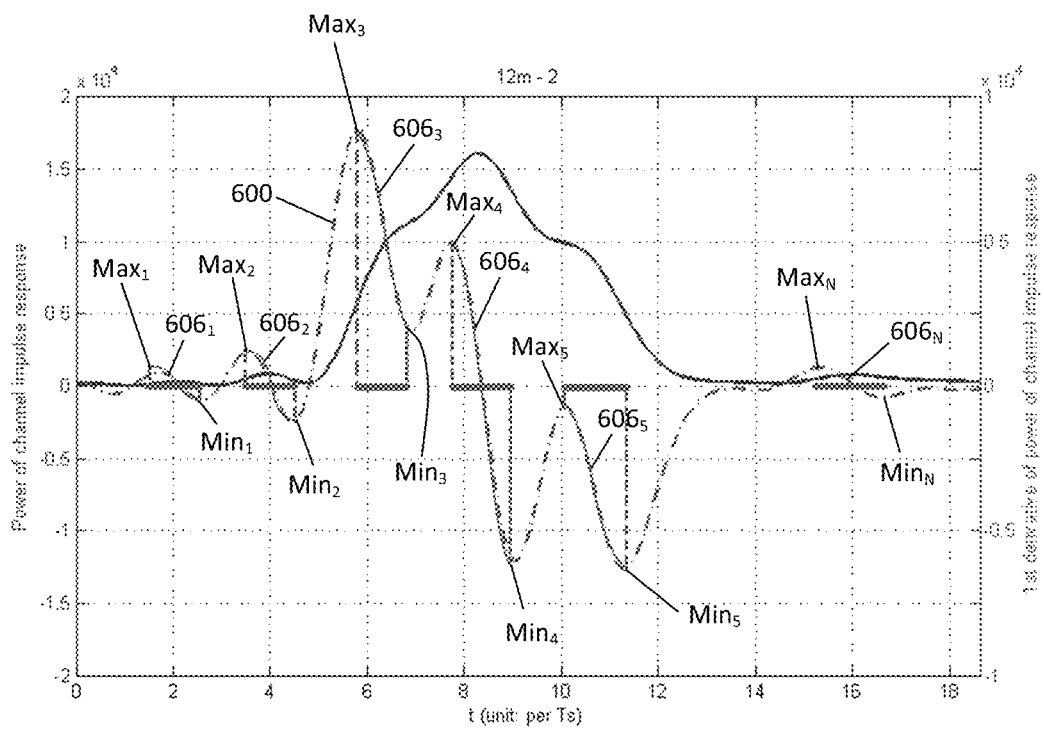
FIG. 9B illustrates the power versus time characteristic showing identification of candidate signal paths.

Referring to FIGS. 6, 7B and 9A, a first derivative 600 of the accumulated power of cross-correlation (power characteristic 400) with respect to time is produced by a first derivative producing module 602. The first derivative signal 600 may be produced in a known manner. Selection of some or all candidate signal paths is performed on the first derivative signal 600.

Referring to FIGS. 6, 7B, 7C and 9A-E, the selection of some or all candidate signal paths involves selecting some extrema from the first derivative signal 600 as indicative of candidate signal paths. The step of selecting some extrema from the first derivative signal 600 preferably comprises selecting all extrema from the first derivative signal 600, although that is not essentially the case. In a first step, all maxima ($Max_1 \ldots Max_N$) and minima ($Min_1 \ldots Min_N$) points on the first derivative signal 600 are identified using, for example, a signal processing module 604. The signal processing module 604 is configured to pair each identified maximum point with its following minimum point whereby a track $606_1 \ldots 606_N$ (FIG. 9B) defined by each pair is considered as a candidate signal path and, more particularly, a candidate first signal path of arrival.

Figure 9C:
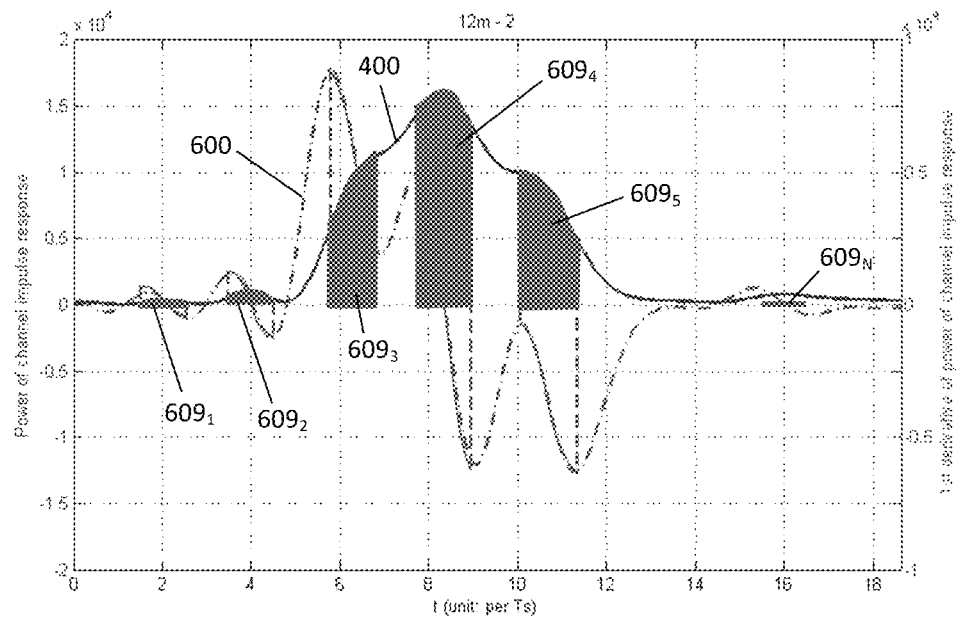
FIG. 9C illustrates the power versus time characteristic showing energy values for the candidate signal paths.
Figure 9D:
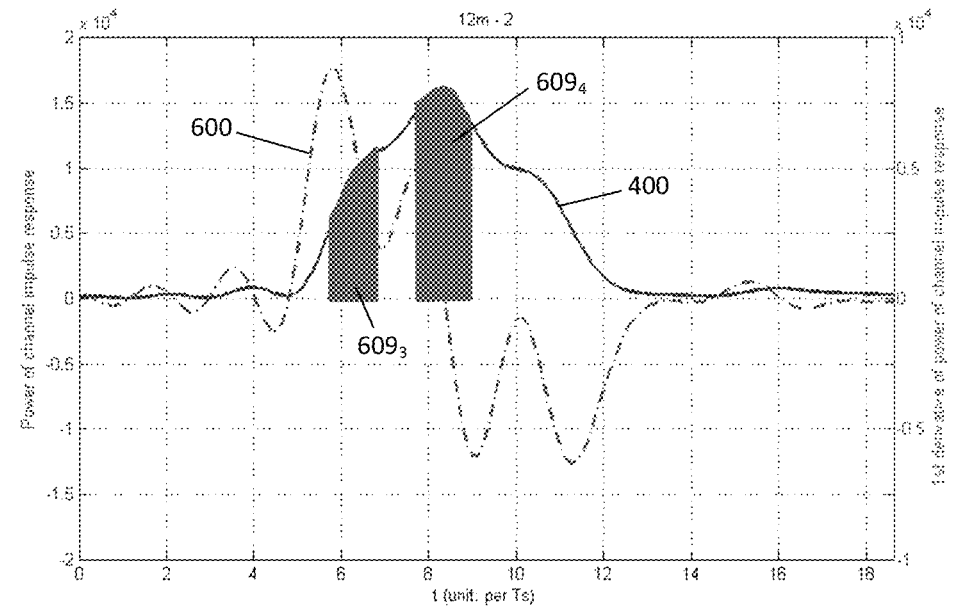
FIG. 9D illustrates the power versus time characteristic showing remaining candidate paths after comparison with the threshold energy value.

Once all tracks $606_1 \ldots 606_N$ considered as candidate first paths of arrival are identified, an energy assessment module 608 calculates an energy value for each track $606_1 \ldots 606_N$. The energy assessment module 608 calculates an energy value for each track $606_1 \ldots 606_N$ by summing for each track $606_1 \ldots 606_N$ its accumulated power of cross-correlation from a starting point $Max_N$ to an end point $Min_N$ of said track $606_N$ defined with respect to the maximum extrema point and the succeeding minimum extrema point for that track $606_N$ on the first derivative signal 600 of the power characteristic 400. The energy value for a track $606_1 \ldots 606_N$ comprises a corresponding area $609_1 \ldots 609_N$ under the power characteristic curve 400 for that track $606_1 \ldots 606_N$ as illustrated by FIG. 9C.

The method of the invention involves deriving a signal arrival time from one or more selected candidate signal paths, i.e. tracks $606_1 \ldots 606_N$. This may comprise using the energy values $609_1 \ldots 609_N$ of all of the tracks $606_1 \ldots 606_N$ and their corresponding times of arrival at the eNB 142 to determine a timing of a signal arrival on a first path of arrival at the eNB 142. Preferably, however, it comprises using an energy value comparison module 610 to compare the energy value $609_1 \ldots 609_N$ of each of said tracks $606_1 \ldots 606_N$ against a threshold value and to discount from further consideration any candidate signal paths, i.e. tracks $606_1 \ldots 606_N$, having an energy value less than the threshold value. FIG. 9C illustrates a result of the energy value comparison step where only two of the tracks $606_3$. and $606_4$ remain not discounted, i.e. available for consideration. Whilst in this illustration the two remaining tracks are adjacent tracks, it will be understood that this may not always be the case.

A final part of the method of the invention comprises using a processing module 612 to assess the not discounted candidate signal paths $606_3$. and $606_4$ having an energy value equal to or greater than the threshold value. If only one non-discounted candidate signal path remains, then the timing of this signal path is selected as the timing of arrival of the signal on the first path of arrival at the eNB 142. If, however, two or more non-discounted candidate signal paths remain as shown in FIG. 9C, a first one of the remaining candidate signal paths (the left-most remaining path $606_3$ in FIG. 9C) is selected along with selection of a remaining candidate signal path $606_4$ having a maximum energy value. From these two selected candidate signal paths $606_3$. and $606_4$, the data processing module 612 determines the timing of arrival of a signal on the first path of arrival as a weighted sum of the respective timings of said two selected remaining candidate signal paths $606_3$. and $606_4$. The weighted sum may comprise am ordinary average of the arrival times, but a different weighting may be applied based on the respective energy values for said selected remaining candidate signal paths $606_3$. and $606_4$.

Figure 9E:
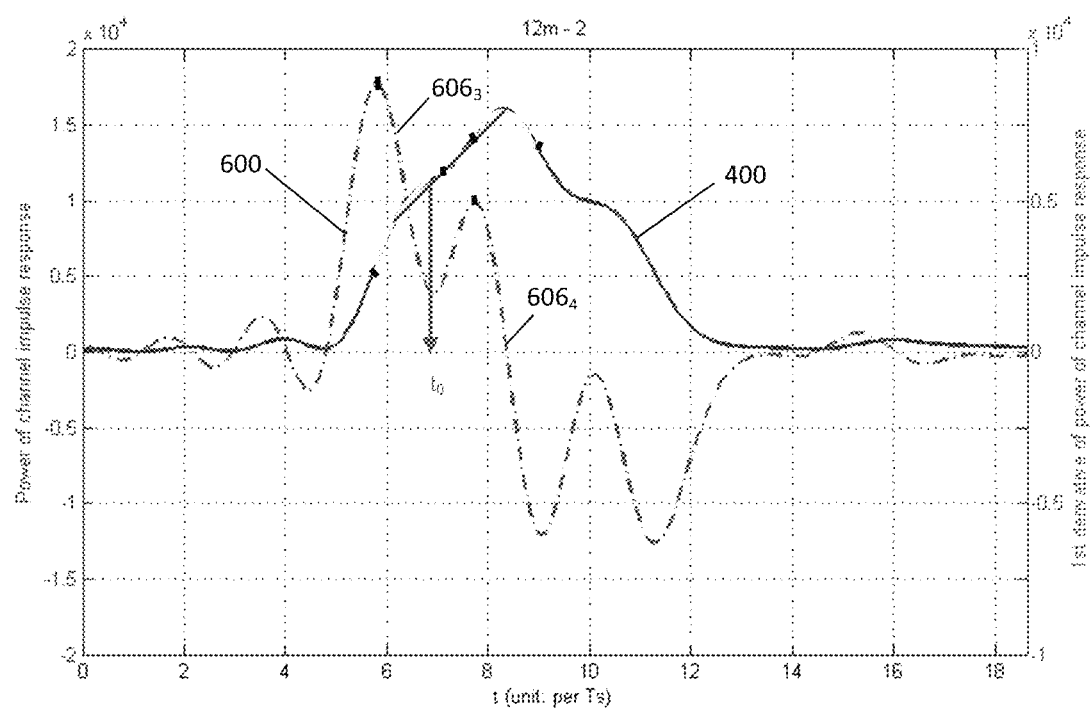
FIG. 9E illustrates the power versus time characteristic showing derivation of a time value for a first path of arrival at the receiver.

FIG. 9E illustrates the timing value $t_0$ of the UE 12 determined by the eNB 142 as the time value for the first path arrival at the eNB 142 for the example shown by FIGS. 9A-D The energy value threshold for determining whether a potential path is considered as one of the candidate first paths is preferably obtained by computing or calculating an average energy of the CIR 517 and then multiplying the average energy by a scaling factor, where the scaling factor depends on or is derived from a topology of the signal path environment between the UE 12 and the eNB 142. This could be obtained by simulation of each signal path environment or scenario. More specifically, since the energy threshold value depends on the topology of the environment, it is best obtained by simulation. Thus, before a wireless network is designed and deployed, a suitable statistical model of the propagation channel is chosen. Based on the channel model, a simulation in a suitable design model is run and statistics on the power of the paths are captured and analyzed. The threshold is then determined based on the power statistics obtained from the simulation. The threshold value can also be validated by testing whereby if the threshold is too high, then it is likely that only the maximum power candidate path will remain not discounted and consequently, some potential and significant paths are neglected, or if the threshold is too low, then some paths with insignificant energy may be included. It is therefore possible to adjust the threshold value to account for such results or even to specify a threshold value without any simulated results. The threshold may be expressed as a scaling factor times the average energy of the CIR. It has been found from simulated results that a scaling factor in the range from 6 to 10 is applicable and, more particularly, that a scaling factor of 8 covers most indoor and outdoor channel models.

The method as hereinbefore described can be used for timing offset estimation in an Orthogonal Frequency Division Multiplexing (OFDM) system.

The invention also provides a non-transitory computer readable medium storing machine readable code which, when executed by a processor, causes a receiver provided in a mobile wireless communications network to perform the steps of the method as hereinbefore described.

Also provided is a receiver for a mobile wireless communications system configured to perform the steps of the method as hereinbefore described.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communications system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of determining timing of arrival of a signal on a path to a receiver in a mobile wireless communications system, the method comprising the steps of:
    obtaining a channel impulse response (CIR) of a signal received at the receiver;
    deriving a power characteristic of the CIR;
    producing a first derivative of the power characteristic with respect to time;
    selecting all extrema from the first derivative of the power characteristic as indicative of candidate signal paths; and
    selecting one or more of said candidate signal paths.

2. The method of claim 1, further comprising the step of: deriving a signal arrival time from the one or more of said selected candidate signal paths.

3. The method of claim 1, further comprising the step of: determining timing of signal arrival on a first path of arrival at the receiver by assessing an energy parameter of each of said candidate signal paths.

4. The method of claim 3, further comprising assessing an energy value of each of said candidate signal paths against a threshold value.

5. The method of claim 4, further comprising using the energy values of all of the candidate signal paths and their corresponding times of arrival at the receiver to determine a timing of a signal arrival on the first path of arrival at the receiver.

6. The method of claim 4, further comprising discounting any candidate signal paths having an energy value less than the threshold value.

7. The method of claim 6, further comprising determining timing of an arrival of a signal on the first path of arrival at the receiver from any remaining candidate signal paths not discounted as having an energy value less than the threshold value, whereby:
    if only one non-discounted candidate signal path remains, then selecting the timing of this signal path as the timing of arrival of the signal on the first path of arrival; and
    if two or more non-discounted candidate signal paths remain, selecting a first one of the remaining candidate signal paths and selecting a remaining candidate signal path having a maximum energy value and determining the timing of arrival of the signal on the first path of arrival as a weighted sum of the respective timings of the selected first remaining candidate signal path and the selected remaining candidate signal path having a maximum energy value.

8. The method of claim 1, wherein the step of selecting all extrema from the first derivative of the power characteristic comprises pairing each maximum extrema point with its succeeding minimum extrema point to thereby identify all candidate signal paths.

9. The method of claim 1, wherein obtaining a CIR of the signal received at the receiver comprises deriving a cross-correlation of the received signal with a local training sequence.

10. The method of claim 9, wherein the received signal comprises an uplink (UL) LTE sounding reference signal (SRS).

11. The method of claim 10, wherein the local training sequence is an SRS signal generated at the receiver for deriving the cross-correlation of the received signal with the local training sequence.

12. The method of claim 11, wherein deriving the cross-correlation between the received signal and the local training sequence comprises:
    converting the received signal to frequency domain by Fast Fourier Transform (FFT);
    extracting the SRS of the received signal from a configured region in a signal resource grid;
    multiplying the extracted SRS with the local training sequence;
    up-sampling the product of multiplying the extracted SRS with the local training sequence to a size larger than the FFT size; and
    converting the product to time domain by Inverse Discrete Fourier Transform (IDFT) to obtain the cross-correlation between the received signal and the local training sequence.

13. The method of claim 10, wherein the step of deriving a power characteristic of the CIR comprises accumulating power of the cross-correlation between the received signal and the local training sequence across a number of sub-frames of the UL SRS.

14. The method of claim 13, further comprising calculating an energy value for each of said candidate signal paths by summing for each candidate signal path accumulated power of cross-correlation from a starting point to an end point of said path defined with respect to a maximum extrema point and its succeeding minimum extrema point for that path on the first derivative of the power characteristic.

15. The method of claim 1, further comprising timing offset estimation in an Orthogonal Frequency Division Multiplexing (OFDM) system.

16. The method of claim 1, wherein the receiver comprises a base station (BS) or eNB in the mobile wireless communications system.

17. A non-transitory computer readable medium storing machine readable code which, when executed by a processor, causes a receiver provided in a mobile wireless communications network to perform the steps of:
- obtaining a channel impulse response (CIR) of a signal received at the receiver;
- deriving a power characteristic of the CIR;
- producing a first derivative of the power characteristic with respect to time;
- selecting all extrema from the first derivative of the power characteristic as indicative of candidate signal paths; and
- selecting one or more of said candidate signal paths.

18. A receiver in a mobile wireless communications system for determining timing of arrival of a signal on a path to the receiver, the receiver comprising:
- a non-transitory computer readable medium storing machine readable code;
- a processor configured to execute said machine code to cause the processor to perform the steps of:
- obtaining a channel impulse response (CIR) of a signal received at the receiver;
- deriving a power characteristic of the CIR;
- producing a first derivative of the power characteristic with respect to time;
- selecting all extrema from the first derivative of the power characteristic as indicative of candidate signal paths; and
- selecting one or more of said candidate signal paths.

19. The receiver of claim 18, the receiver comprises a base station (BS) or eNode B in the mobile wireless communications system.

* * * * *